US012025953B2

(12) United States Patent
Ranganathan et al.

(10) Patent No.: US 12,025,953 B2
(45) Date of Patent: Jul. 2, 2024

(54) DIAL FOR A CERAMIC TIMEPIECE AND A METHOD FOR MANUFACTURING

(71) Applicant: TITAN COMPANY LIMITED, Tamilnadu (IN)

(72) Inventors: Rajagopalan Ranganathan, Hosur (IN); Chandrasekaran Naganathan, Hosur (IN); Yogi Anand, Hosur (IN); Saravanan Kaliyamoorthy, Hosur (IN); Guruprasath Brahmin Ragavendiran, Hosur (IN)

(73) Assignee: TITAN COMPANY LIMITED, Tamilnadu (IN)

( * ) Notice: Subject to any disclaimer, the term of this patent is extended or adjusted under 35 U.S.C. 154(b) by 1332 days.

(21) Appl. No.: 16/492,346

(22) PCT Filed: Mar. 7, 2018

(86) PCT No.: PCT/IB2018/051476
§ 371 (c)(1),
(2) Date: Sep. 9, 2019

(87) PCT Pub. No.: WO2018/163083
PCT Pub. Date: Sep. 13, 2018

(65) Prior Publication Data

US 2020/0292993 A1 Sep. 17, 2020

(30) Foreign Application Priority Data

Mar. 7, 2017 (IN) ............................. 201741007984

(51) Int. Cl.
*G04B 19/12* (2006.01)
*G04B 37/22* (2006.01)
*G04D 3/00* (2006.01)

(52) U.S. Cl.
CPC ............. *G04B 19/12* (2013.01); *G04B 37/22* (2013.01); *G04D 3/0069* (2013.01)

(58) Field of Classification Search
CPC ......... G04B 19/12; G04B 37/16; G04B 37/22
See application file for complete search history.

(56) References Cited

U.S. PATENT DOCUMENTS 3,756,017 A * 9/1973 Genta ................ G04B 37/0008 368/291
2003/0007424 A1 * 1/2003 Watanabe ............. G04B 37/18 368/204

(Continued)

FOREIGN PATENT DOCUMENTS

CN 103265287 A 8/2013

OTHER PUBLICATIONS

International Search Report and Written Opinion of the International Searching Authority issued in PCT/IB2018/051476, dated Jul. 5, 2018; ISA/IN.

(Continued)

*Primary Examiner* — Edwin A. Leon
*Assistant Examiner* — Jason M Collins
(74) *Attorney, Agent, or Firm* — Harness, Dickey & Pierce, P.L.C.

(57) ABSTRACT

The present disclosure relates to a case assembly for a ceramic timepiece. The case assembly is configured to accommodate a movement which includes a first groove, defining an inner periphery of a first side of the casing. The first groove accommodates a glass of the timepiece, within a thickness of the casing. Further one or more provisions are provided in a second side of the casing, where each of the one or more provisions is configured to receive an adapter. Each of the adapter receives a fastening member, for securing a back plate of the timepiece within the height of the (Continued)

casing. A dial including a pair of projections extending outwardly from two opposing portions of an outer periphery of the casing is provided to receive a strap of the timepiece. The configuration of the dial helps in reducing the thickness of the timepiece.

12 Claims, 6 Drawing Sheets

(56) References Cited

U.S. PATENT DOCUMENTS

| | | | | |
|---|---|---|---|---|
| 2003/0007472 | A1 | 1/2003 | Yamada | |
| 2015/0122774 | A1* | 5/2015 | Fernandez Ciurleo | G04B 19/12 63/35 |
| 2017/0038734 | A1* | 2/2017 | Issartel | B23K 26/0624 |
| 2017/0205538 | A1* | 7/2017 | Furusato | G04C 3/14 |
| 2018/0011448 | A1* | 1/2018 | Von Allmen | G04B 37/1493 |

OTHER PUBLICATIONS

International Preliminary Report on Patentability (Chapter II of The Patent Cooperation Treaty) issued in PCT/IB2018/051476, completed Jul. 3, 2019; IPEA/IN.

* cited by examiner

DIAL FOR A CERAMIC TIMEPIECE AND A METHOD FOR MANUFACTURING

TECHNICAL FIELD

Present disclosure generally relates to the field of horology. Particularly, but not exclusively, the disclosure relates to a ceramic timepiece. Further, embodiments of the present disclosure relate to a dial for the ceramic timepiece and a method of manufacturing the dial.

BACKGROUND OF THE DISCLOSURE

Conventionally, timepieces may be employed with a dial, or in general, a display, constituting an analog configuration, a digital configuration or both. The timepieces with the analog dial configuration, in general, may be employed with a suitable mechanism generally referred to as movement to operate various indication units such as hands, wheels and the like, for indicating the time, date, day, etc. On the other hand, the timepieces including the digital dial configuration may be programmed to perform multiple functions including time indication.

Though, timepieces with digital dial configurations are multi-functional and attractive, the demand for timepieces employing the analog dial configuration is increasing day-by-day. In general, the timepieces with analog dial configuration may be considered as a symbol of royalty and luxury, as these timepieces provide an aesthetical appeal to the user. With the increase in competition and customer requisites, efforts have been continuously made to improve aesthetical appeal and compactness of the timepieces with the analog dial configuration. The aesthetic appeal may be driven by parameters including, but not limited to, nature of materials used for manufacturing, aesthetic design, operable characteristics of the timepieces and the like, which may be considered to enhance the overall appearance of the timepiece.

Generally, the timepieces may be manufactured using a myriad of materials including, but not limited to, stainless steel, gold, silver, and the like. One such category of timepieces having material which are considered to stand-out and depict luxury are those made of ceramic materials. These ceramic timepieces may be designed by considering the properties such as, but not limited to, a high mass-weight ratio, an edge-lustrous appearance, scratch-free surfaces, a seamless structure, and the like, are upheld to influence the user.

With advancements in the horological industry and customer needs, timepiece manufactures are focusing on improving the aesthetics and reducing the thickness of the timepieces. Nonetheless, it may be noted that the timepieces manufactured employing the ceramic materials are, in general, bulky and heavy, as the ceramic is a brittle material, and reducing thickness of the ceramic timepiece may lead to various challenges.

The present disclosure is directed to overcome one or more limitations stated above or any other limitation associated with the prior arts.

The information disclosed in this background section is only for enhancement of understanding of the general background of the invention and should not be taken as an acknowledgment or any form of suggestion that this information forms the prior art already known to a person skilled in the art.

SUMMARY OF THE DISCLOSURE

One or more shortcoming of the prior arts and conventional methods are overcome by providing with a method for manufacturing a ceramic timepiece with a slim profile.

In one non-limiting embodiment of the present disclosure, a dial for a ceramic timepiece is disclosed. The dial includes a casing, which is configured to accommodate a movement of the ceramic timepiece. The casing comprises a first groove, defined in an inner periphery of a first side of the casing. The first groove is configured to accommodate a glass of the ceramic timepiece within a thickness of the casing. Further, the one or more casings includes one or more provisions, provided in a second side of the casing. Each of the one or more provisions is configured to receive an adapter, where the adapter in each of the one or more provisions receives a fastening member, for securing a back plate of the ceramic timepiece within the thickness of the casing. The dial further includes a pair of projections, extending outwardly from two opposing portions of an outer periphery of the casing, wherein the pair of projections receive a strap of the ceramic timepiece.

In an embodiment, the one or more provisions are defined with an anti-rotational profile. Further, an outer body of the adapter is configured to match the profile of the one or more provisions.

In an embodiment, the adapter includes a bore, defined with a plurality of internal threads, to receive the fastening member.

In an embodiment, the casing includes a step portion provisioned on the first side. The step portion extends downwardly from an upper surface of the casing towards the pair of projections.

In an embodiment, the casing further comprises a protrusion, extending in an inner surface of the casing. The protrusion is adapted to support a dial plate of the ceramic timepiece.

In an embodiment, the casing comprises a cut-out, on the first side of the casing and between the pair of projections. The cut-out accommodates a protruding member of the strap.

In an embodiment, the thickness of the casing ranges from about 4 millimeters to about 4.5 millimeters.

In an embodiment, a thickness of the movement ranges from about 1.10 millimeters to 1.20 millimeters.

In an embodiment, the pair of projections are configured such that, a width of each projection of the pair of projections is at least two times of a length of each projection of the pair of projections.

In an embodiment, the glass is bonded to the first groove.

In an embodiment, the casing comprises a lateral hole, extending from an outer surface to the inner surface of the casing. The lateral hole accommodates an operative stem in a transitional fit.

In an embodiment, the casing comprises a second groove defined in an inner periphery in the second side of the casing. The second groove is configured to enclose the back plate.

In another non-limiting embodiment of the present disclosure, a method for manufacturing a dial of a ceramic timepiece is disclosed. The method comprises steps of mixing ceramic particles with one or more binders, to produce a formable ceramic substance. The formable ceramic substances are then pressed to form a green part of a casing. The green part of the casing is then dried by application of controlled heat. The dried green part of the ceramic substance is sintered, to melt the one or more binders and form the casing. The casing is then subjected to machining operations so that, first groove is formed in an inner periphery of a first side of the casing. The first groove accommodates a glass, where depth of the first groove is defined to accommodate the glass within a thickness of the casing. Further, one or more provisions are formed in a second side of the casing. Each of the one or more provisions is configured to receive an adapter, where the adapter in each of the one or more provisions receives a fastening member, for securing a back plate of the ceramic timepiece within the thickness of the casing. Also, the casing is formed to produce a pair of projections in opposing portions of an outer periphery of the casing. The pair of projections extends outwardly from the casing and receive a strap of the ceramic timepiece.

In an embodiment, the sintering of the green part of the casing includes a first sintering process for melting the one or more binders, and a second sintering process for forming the casing.

In an embodiment, the first sintering is carried out at a temperature ranging from about 150° C. to about 450° C.

In an embodiment, the second sintering process is carried out at a temperature ranging from about 1500° C. to about 2500° C.

In an embodiment, the first groove is formed by a grinding operation.

In an embodiment, the one or more provisions are formed by a drilling operation.

In an embodiment, the one or more provisions are defined with an anti-rotational profile, and the anti-rotational profile is formed by the grinding operation.

In an embodiment, the pair of projections are formed by the grinding operation, and are configured such that, a width of each projection of the pair of projections is at least two times of a length of each projection of the pair of projections.

In an embodiment, the method comprises forming a cut-out in between the pair of projections for accommodating a protruding member of a strap.

In an embodiment, the method further comprises, forming a protrusion in an inner surface of the casing, by the grinding operation, to support a dial plate of the ceramic timepiece.

In an embodiment, the method further comprises forming a second groove in an inner periphery of the second side of the casing by the grinding operation, to enclose the back plate.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the detailed disclosure. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which.

Figure 2:
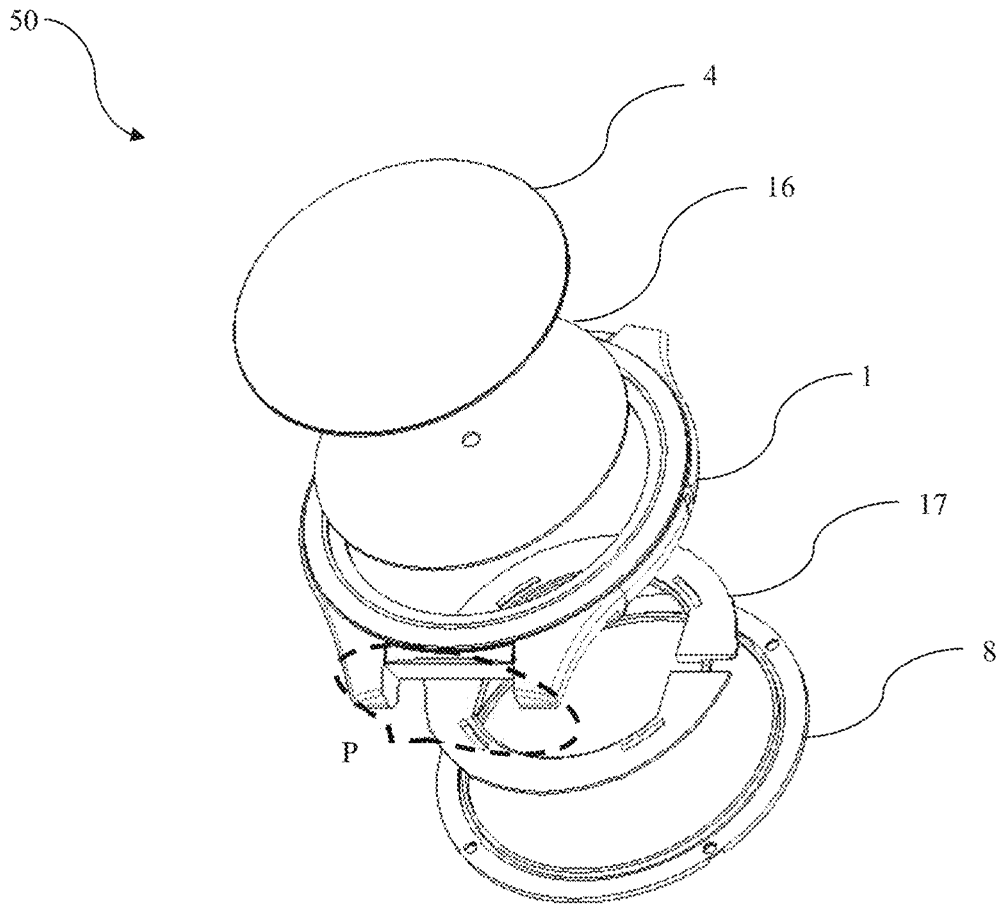
FIG. 2 illustrates an exploded view of a casing of the ceramic timepiece, in accordance with an embodiment of the present disclosure.
Figure 5A:
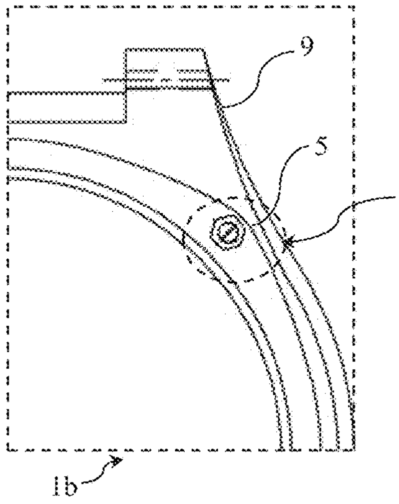

FIG. 5*a* illustrates a magnified view of a portion of a second side of casing of FIG. 2.

Figure 5B:
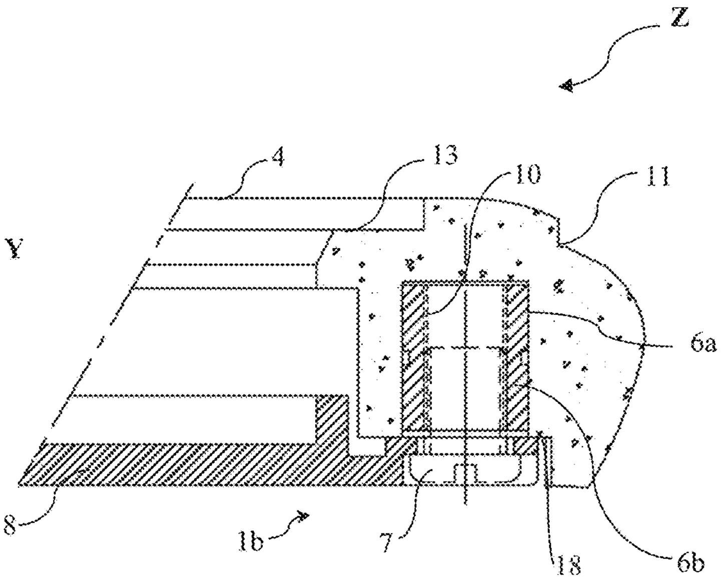

FIG. 5*b* illustrates a sectional side view of a portion Y of FIG. 5*a*.

Figure 6:
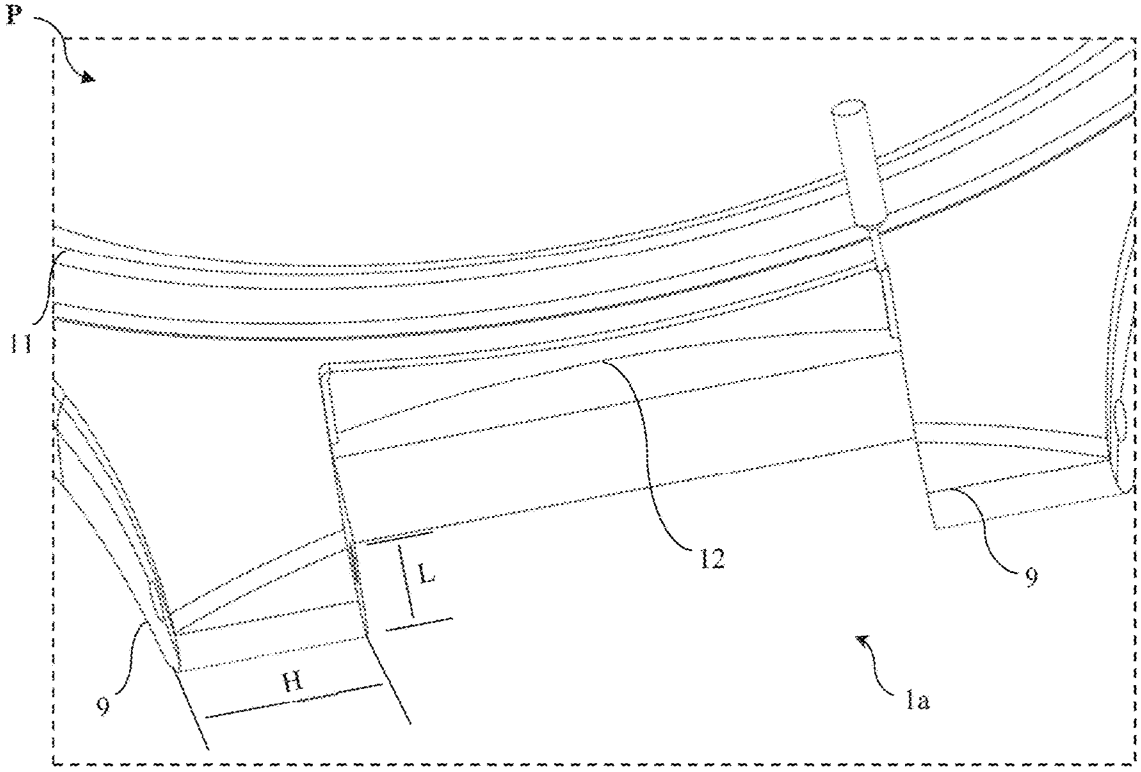

FIG. 6 illustrates a magnified view a portion P of the casing of FIG. 2.

Figure 3:
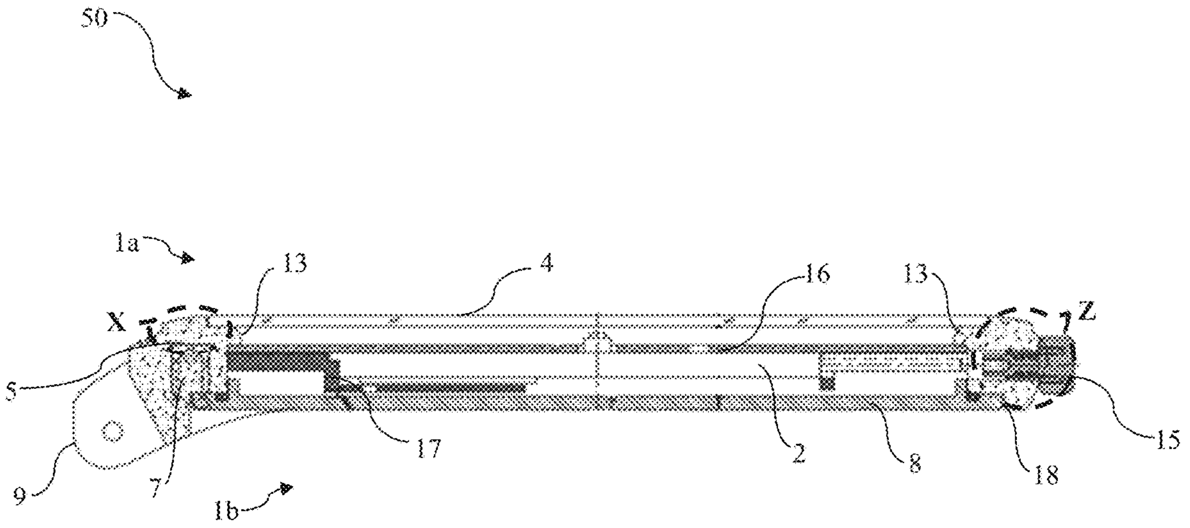
FIG. 3 illustrates a sectional side view of the casing of FIG. 2.
Figure 7:
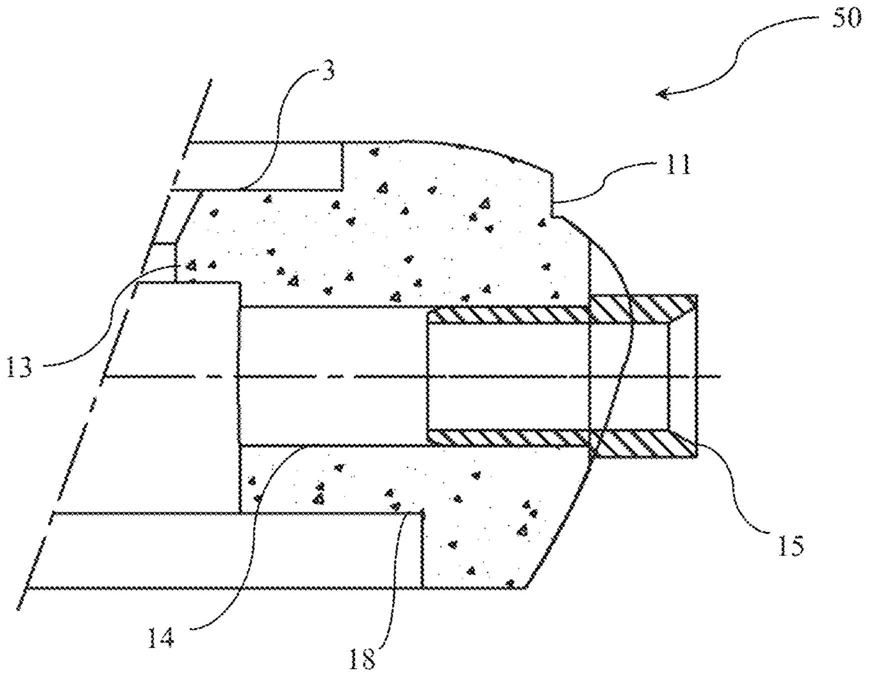

FIG. 7 illustrates a sectional view of a portion Z of the casing of FIG. 3, in accordance with one embodiment of the present disclosure.

Figure 8:
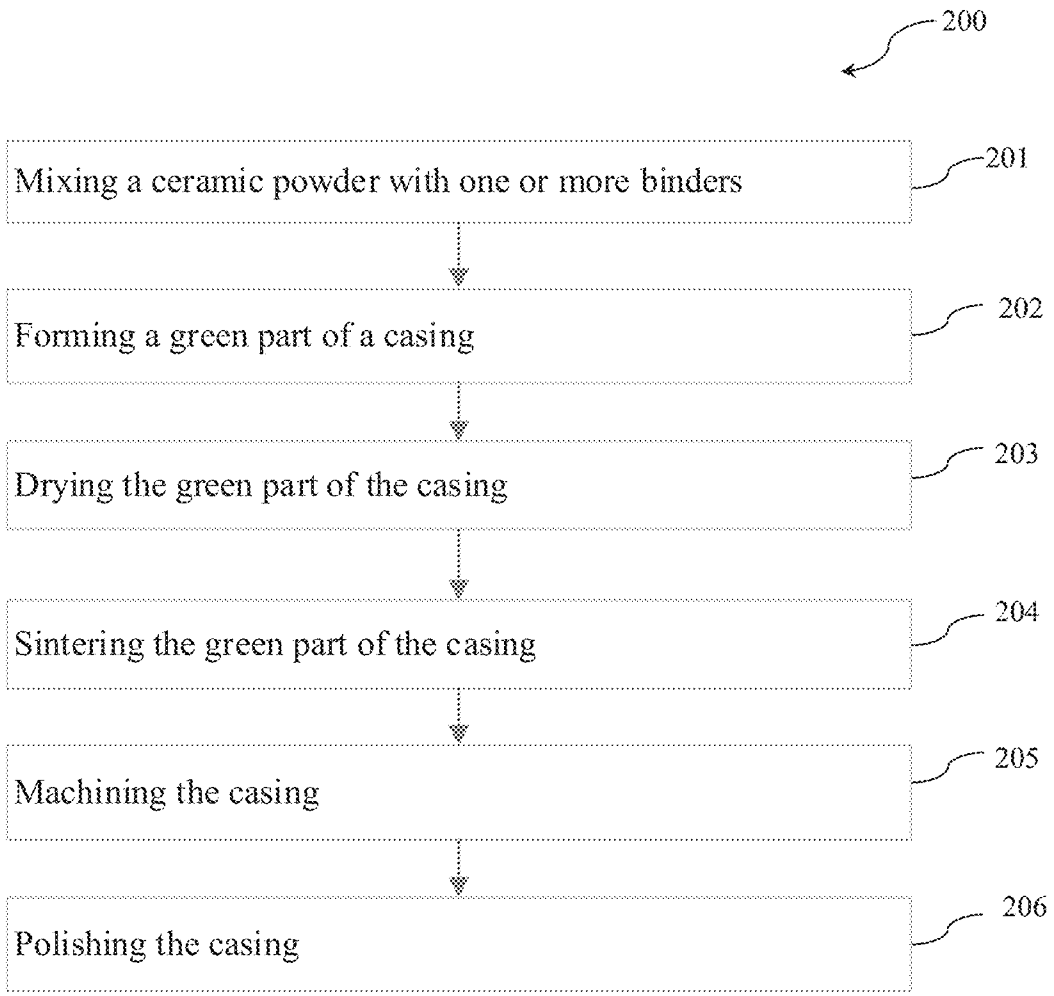

FIG. 8 is a flowchart of a method for manufacturing the dial of the ceramic timepiece, in accordance with one embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

While the embodiments in the disclosure are subject to various modifications and alternative forms, specific embodiment thereof has been shown by way of example in the figures and will be described hereinbelow. It should be understood, however that it is not intended to limit the disclosure to the particular forms disclosed, but on the contrary, the disclosure is to cover all modifications, equivalents, and alternatives falling within the scope of the disclosure.

It is to be noted that a person skilled in the art would be motivated by the present disclosure and may be motivated to modify various compositions, shapes, profiles, and configurations of the ceramic timepiece. However, such modification should be construed within the scope and spirit of the instant disclosure. Accordingly, the drawings show only those specific details that are pertinent to understand the embodiments of the present disclosure so as not to obscure the disclosure with details that will be readily apparent to those of ordinary skill in the art having the benefit of the description herein.

The terms “comprises”, “comprising”, or any other variations thereof used in the disclosure, are intended to cover a non-exclusive inclusion, such that a mechanism and a system that comprises a list of components does not include only those components but may include other components not expressly listed or inherent to such system, or assembly, or device. In other words, one or more elements in a system or an apparatus proceeded by “comprises . . . a” does not, without more constraints, preclude the existence of other elements or additional elements in the system or mechanism.

Embodiments of the disclosure disclose a dial for a ceramic timepiece. The ceramic timepiece as generally known in the art may be made of ceramic material by adding suitable additives or binders. The ceramic timepieces are considered as a symbol of luxury owing to their appearance and appeal. The ceramic timepiece in general includes a dial for accommodating a movement, and a strap. The dial, in general, may also be terms as “a casing assembly”, may be composed of the ceramic material, and optionally the strap may also be composed of a ceramic material. The dial of the ceramic timepiece plays a crucial role in defining the overall thickness of the ceramic timepiece. Hence, the present disclosure discloses a dial for the ceramic timepiece with a minimum thickness, and without compromising on the physical strength of the dial.

Accordingly, the dial of the present disclosure comprises a casing, configured to accommodate a movement. The casing includes a first groove, defined in an inner periphery of a first side of the casing. The first groove is configured with a depth to accommodate a glass of the timepiece, within a thickness of the casing. The casing further includes one or more provisions in a second side of the casing, where each of the one or more provisions is configured to receive an adapter. The adapter, in each of the plurality of provisions, receives a fastening member, for securing a back plate of the timepiece within the thickness of the casing. The dial is also provisioned with a pair of projections, extending outwardly from two opposing portions of an outer periphery of the casing. The pair of projections receives a strap of the timepiece. This configuration of the dial, ensures a minimum thickness, and thereby help to manufacture a slim ceramic timepiece. The ceramic timepiece according to embodiments of the disclosure may have thickness ranging from about 4 mm to about 4.5 millimeters, when compared to the conventional ceramic timepiece with a thickness of about 7.5 millimeters.

The present disclosure also discloses a method of manufacturing a dial for a ceramic timepiece. The method employed in the present disclosure helps to manufacture the dial with the slim profile. The method broadly includes steps of mixing a ceramic powder with one or more binder, to produce a formable ceramic substance. The formable ceramic substance is then pressed to form a green part of a casing. The latter is dried by application of controlled heat. The dried green part of the casing is subjected to sintering, which melts the one or more binders and forms the casing. Further, the casing is subjected for various primary secondary machining operations to form the dial. In the method of the present disclosure, the additional material may be added during the forming process, and the additional material would be removed during the machining process for precision of manufacturing the dial.

In the following detailed description of the embodiments of the disclosure, reference is made to the accompanying figures that form a part hereof, and in which the ceramic timepieces are shown by way of illustration specific embodiments in which the disclosure may be practiced. These embodiments are described with sufficient details to enable those skilled in the art to practice the disclosure, and it is to be understood that other embodiments may be utilized and that changes may be made without departing from the scope of the present disclosure. The following description is, therefore, not to be taken in a limiting sense.

Figure 1:
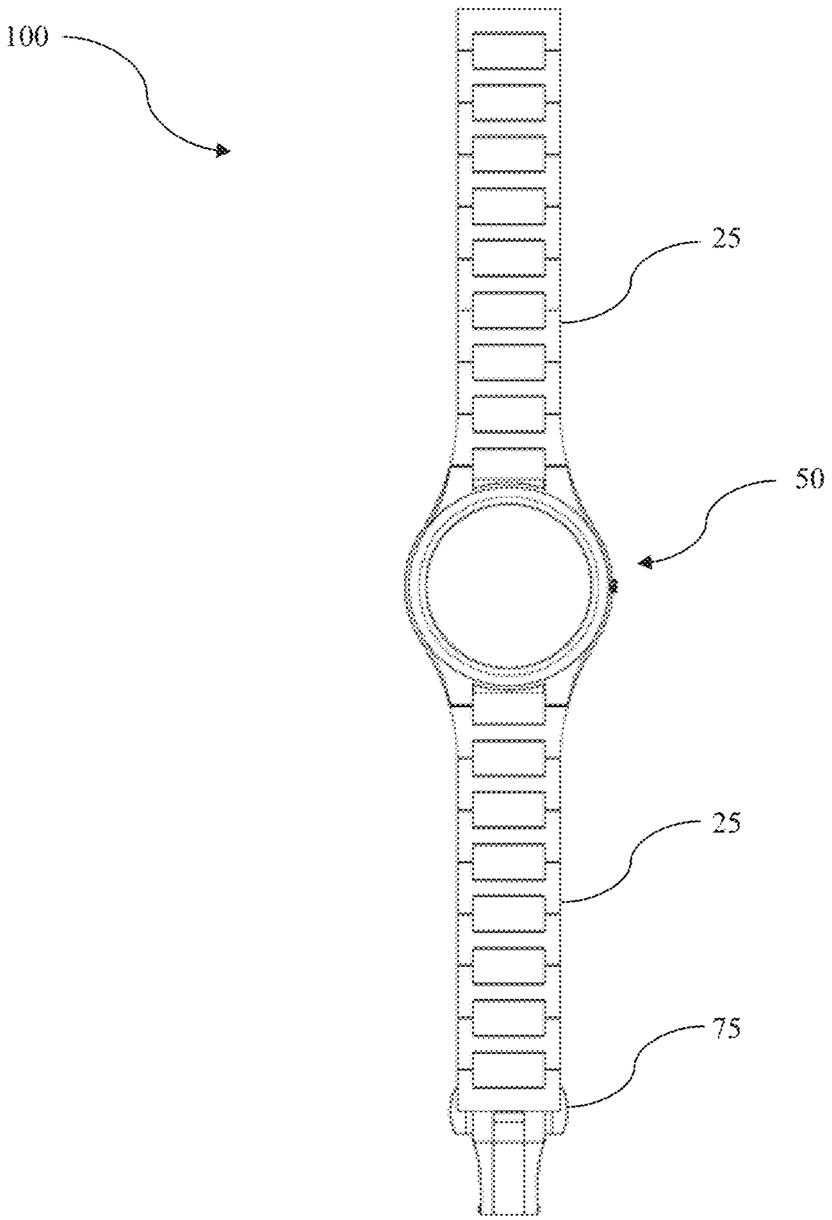
FIG. 1 illustrates a top view of a ceramic timepiece, in accordance with one embodiment of the present disclosure.

FIG. 1 is an exemplary embodiment of the present disclosure which illustrates a ceramic timepiece (100). The ceramic timepiece (100) comprises a strap (25) and a dial (50). The strap (25) may be employed to secure the ceramic timepiece (100) on a user, while the dial (50) is employed to display the time. Further, the strap (25) may be coupled at two opposing portions of the dial (50) and may be removably fixed therein. Additionally, the strap (25) is provisioned with a securing means (75), with a male part on at one end of the strap (25) and a female part at the other end, to ensures that the dial (50) is securely positioned on the user. Here, the dial (50) and the strap (25) according to embodiments of the disclosure are made of a ceramic material. However, the strap (25) may also be made of materials including, but not limited to, metallic material, polymeric material, leather, and the like.

Turning now to FIG. 2, which illustrates the exploded view of the dial (50). The dial (50) may be a support member of the ceramic timepiece (100) and is configured to support all the components of the ceramic timepiece (100). The dial (50) includes a casing (1), which may be configured to support and accommodate a glass (4), in a first side (1*a*), and a back plate (8), in a second side (1*b*). Further, a movement (2) [as best seen in FIG. 3] is positioned within the casing (1). Here, one skilled in the art would recognize that the first side (1*a*) and the second side (1*b*) may be referred to a top side and a bottom side of the casing (1), respectively, with respect to orientation of the figures. However, the same may vary based change in orientation of the figures. Further, the back plate (8) along with a support element (17) is provisioned to support the movement (2) within the casing (1). The casing (1) is further configured to support a dial plate (16), where the dial plate (16) is positioned on a top surface of the movement (2). The dial plate (16) includes one or more indices [not shown in figures], for indicating a reference to the time therewith. One skilled in the art would recognize that the dial plate (16), and in-turn the movement (2), may be centrally positioned within the casing (1). In view of this, the dial plate (16), and in-turn the movement (2) may be hermetically sealed by the glass (4) from the first side (1*a*) and the back plate (8) from the second side (1*b*). The support element (17), provided between the back plate (8) and the movement (2), may assist by exerting a requisite force on the movement (2), in order to maintain the movement (2) at the central position therein.

As shown in FIG. 3, the casing (3) comprises a first groove (3) defined along an inner periphery of the casing (1), on the first side (1*a*). The first groove (3) may accommodate the glass (4) of the ceramic timepiece (100). In an embodiment of the present disclosure, the glass (4) may be mineral glass, a sapphire glass, or any synthetic fiber glass. It may be noted that a predefined clearance and/or limit may be provided between the glass (4) and the first groove (3) so that, a transitional fit may be maintained therein. The glass (4) may be directly bonded to the first groove (3) by means including, but not limited to, adhesive bonding, vacuum clamping, and the like, as best seen in in FIG. 4. The first groove (3) may be defined with a depth such that, when the glass (4) is fixed within the first groove (3) of the dial (50), a top surface of the glass (4) is compelled to be concealed within a thickness (T) of the casing (1). This concealing of the glass (4) within the thickness (T) of the casing (1) mitigates requirement of a bezel ring for fixing the glass (4). This helps in reducing the overall thickness of the ceramic timepiece (100).

Figure 4:
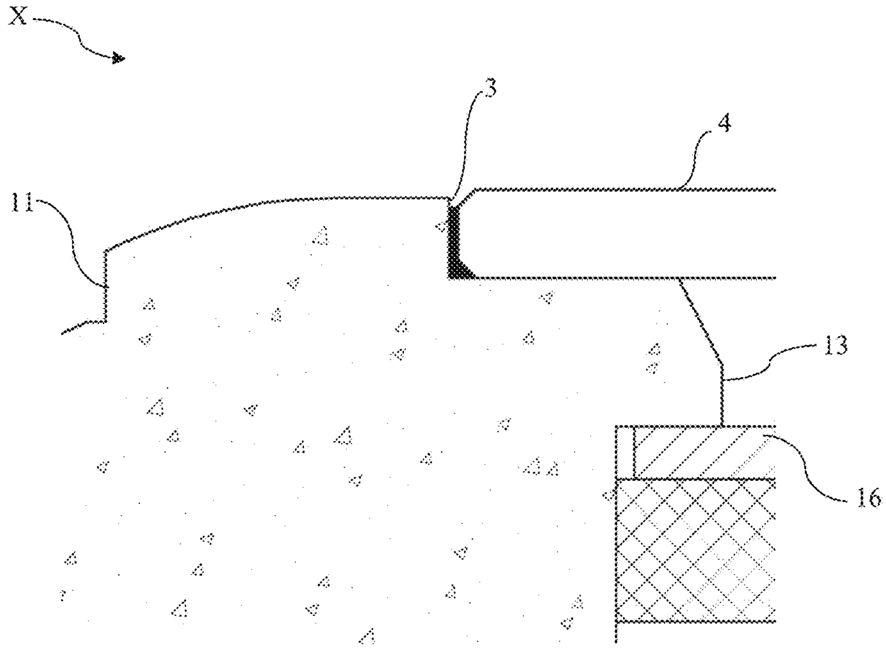
FIG. 4 illustrates a magnified view of the portion X of FIG. 3.

Referring now to FIG. 4, a protrusion (13) is provisioned in the casing (1), where the protrusion (13) is constructed to extend from an inner surface of the casing (1). The protrusion (13) is configured to adaptably receive the glass (4) on the first side (1*a*), while is configured to support and/or restrict the dial plate (16) on the second side (1*b*). The protrusion (13) also provides an additional area for the glass (4) to be accommodated, whereby the protrusion (13) may reduce the effects of stress concentration on the glass (4). Also, the protrusion (13) supports and/or restricts the dial plate (16) to inhibit misalignment of the dial plate (16), and in-turn the movement (2), from the central position.

Referring back to FIG. 3, for securing the back plate (8) in the casing (1), a second groove (18) is defined along the inner periphery of the casing (1), in the second side (1*b*). The second groove (18) is adapted to enclose the back plate (8) within the casing (1). Here, unlike the glass (4) on the first side of the casing (1), it may not be preferred to fix the back plate (8) to the second groove (18), as components such as, the movement (2), the dial plate (16), the support element (17), and the like, may be required to be periodically removed, for servicing. In view of this, the base plate may be removably fixed to the casing (1) by temporary joining techniques including, but not limited to, fastening, snap-fit, clamping and the like. As an example, fixing of the back plate (8) may be achieved by fastening means. As the casing (1) particularly constitutes ceramic material, tapping of the casing (1) may not be feasible, and hence, one or more provisions (5) are defined on the second side (1*b*) of the casing (1), as seen in FIG. 5*a*. Each of the one or more provisions (5) are configured to receive an adapter (6*a*), where the adapter (6*a*) includes an outer body (6*b*), consisting of a bore defined with a plurality of internal threads (10). The adapter (6*a*) in each of the one or more provisions (5) is in-turn configured to receive and secure a fastening member (7), as best seen in FIG. 5*b*. The plurality of internal threads (10) of the adapter (6*a*) receives a stem portion of the fastening member (7), while a head portion abuts the back plate (8). This configuration of the fastening member (7) secures the back plate (8), and in-turn hermetically sealing the components thereof. In the exemplary embodiment, the one or more provisions (5) are profiled as a hexagonal groove, as best seen in FIG. 5*a*. Correspondingly, the outer body (6*b*) of the adapter (6*a*) is also profiled as a hexagonal member, in order to match the profile of the one or more provisions (5). Here, one skilled in the art would recognize that the hexagonal profile of the one or more provisions (5) defines an anti-rotational profile, which may also be including, but not limited to, triangle, square, rectangle, and the like. It may be noted that, edges of these anti-rotational profile of the one or more provisions (5) and the outer body (6*b*) of the adapter (6*a*) may engage with one another and may assist to inhibit rotatory motion and/or slippage of the adapter (6*a*) from the one or more provisions (5), during operating the fastening member (7). In an embodiment, the adapter (6*a*) may be bonded to the one or more provisions to arrest linear movement of the adapter (6*a*) with respect to the casing (1). The second groove (18) and the one or more provisions (5) accommodates the back plate (8) such that, a bottom surface of the back plate (8) is within the thickness (T) of the casing (1).

In an embodiment, dimensions and/or tolerances of the first groove (3) and the second groove (18) are adaptably selected in accordance with the dimensions of the glass (4) and the back plate (8), respectively. As an example, the thickness of the glass (4) may be in the range of about 0.3 millimeters to 0.8 millimeters, while the thickness of the back plate (8) may be in the range of about 0.4 millimeters to about 0.8 millimeters, in order to be suitably accommodated within a predefined dimension of the casing (1). The casing (1) may be provisioned with the predefined dimension, particularly, the thickness (T) in the range of about 4 millimeters to about 4.5 millimeters. Additionally, the movement (2) may consist a thickness of about 1.10 millimeters to 1.20 millimeters so that, the movement may be adaptably fixed within the casing (1).

The casing (1) further includes a pair of projections (9), where the pair of projections (9) is constructed to extend outwardly from two opposing portions of an outer periphery of the casing (1), for connecting the casing (1) to the strap (25), as best seen in FIG. 1. Here, the two opposing portions of the casing (1) assists to maintain the symmetry of the dial (50) about each of the strap (25). Further, the pair of projections (9) are formed such that, a width (W) of each projection of the pair of projections (9) is at least two times of a length (L) of each projection of the pair of projections (9). This ratio between the width (W) and the length (L) of each projection of the pair of projections (9) ensures to provide a structural stability at the interface of the casing (1) and the strap (25). Further, as shown in FIG. 6, a cut-out (12) may be on the first side (1*a*) of the casing (1), and in-between the pair of projections (9), on either side of the casing (1). This cut-out (12) may form a platform for accommodating a protruding member of the strap (25) [not shown in Figures], thereby reducing the formation of a void space between the casing (1) and the strap (25). Due to this reduced void space, the interface between the casing (1) and the strap (25) appears to be aesthetically appealing to the user. Also, a step portion (11) may be defined in the casing (1), such that the step portion (11) extends downwardly and outwardly from an upper surface of the casing (1), on the first side (1*a*). This step portion (11) tends to depict as a thin bezel ring, for accommodating the glass (4), thereby making the dial (50) aesthetically appealing to the user.

In an embodiment, for operating the movement (2) to adjust and/or calibrate functions such as, but not limited to, time, date, day, month, and the like, an operative stem (15) may be provisioned. This operative stem (15) is positioned within a lateral hole (14) in the casing (1). In an embodiment of the disclosure, the operative stem (15) may be coupled to the lateral hole (14) by the transitional fit, in order to avoid chip-off of the casing (1). Additionally, the person skilled in the art would also appreciate that a cover member [not shown in Figures] may be provided around the operative stem (15), for steadily and securely positioning therein.

Turning now to FIG. 8, which is an exemplary embodiment of the present disclosure illustrating a flowchart of a method (200) for manufacturing a dial (50) of a ceramic timepiece (100). The method may be employed to manufacture the dial (50) constituting the ceramic materials, for any timepiece.

The order in which the method is described is not intended to be construed as a limitation, and any number of the described method blocks may be combined in any order to implement the method. Additionally, individual blocks may be added or deleted from the methods, without departing from the scope of the subject matter described herein. Furthermore, the method can be implemented in any suitable hardware, software, firmware, or combination thereof.

At block 201, ceramic particles are mixed with one or more binders, with a required a proportion of the ceramic particle and the one or more binders. This mixing of the ceramic powder with the one or more binders renders to produce a formable ceramic substance. In an embodiment, the ceramic particles may be in the form of an amorphous structure, a crystalline structure, and the like, and should not construe the form of the ceramic particles to be a limitation. As an example, the ceramic particles may constitute zirconium, oxides, nitrides, and the like. Further, this formable ceramic substance is subjected to forming process including, but not limited to, pressing, in order to produce a green part of the casing (1), as shown in block 202. It may be noted that the formable ceramic substance may be introduced into means including, but not limited to, a jig assembly, a mold assembly, and the like, and then may be subjected to application of press, for forming a molded structure of the green part of the ceramic, which may resemble the casing (1).

Then, the green part of the casing (1) is dried, by application of controlled heat, as shown in block 203. Here, the process of drying may be performed by a forced drying process, in order to control the heat subjected therein, however, based on the requirements, the natural drying process may also be employed. Due to the drying process, the green part of the casing (1) may undergo a reduction in size, i.e. reduction in overall dimension, as a result of shrinkage, evidently rendering that the dried green part of the casing (1) may comparatively be smaller than the green part of the casing (1).

The dried green part of the casing (1) is then sintered, as at block 204. The sintering may be performed in at least two steps. Such that in a first sintering process, the one or more binders are melted in the dried green part of the casing (1), while in a second sintering process, the one or more binders are melted to form a matrix for the green part of the casing (1), in order to form a rigid structure of the casing (1). Here, the first sintering process is performed at a temperature range from about 150° C. to about 450° C., while the second sintering process is performed at a temperature ranging from about 1500° C. to about 2500° C. It may be noted that the temperature ranges for performing the sintering process, i.e. both the first sintering process and the second sintering process, may be varied in accordance with the composition of the ceramic particles, the composition of the one or more binders, and also the requisite properties of the casing (1). Additionally, the one skilled in the art should not construe that at least two-steps of the sintering process are required to form the casing (1), however, depending on properties such as, but not limited to, rigidity, formability, machinability, and the like, the sintering process may also be reduced to a single sintering process. Similar to the drying process, on completion of the sintering process, the dried green part of the casing (1) may undergo shrinkage.

At a block 205, the casing (1) is subjected for machining. During the machining, the casing (1) may be machined to the predefined dimension, particularly, to the thickness (T) ranging from about 4 millimeters to about 4.5 millimeters such that, the movement (2) consisting a thickness of about 1.10 millimeters to 1.20 millimeters, may be fixed within the casing (1). Also, during the machining, the first groove (3) may be formed in an inner periphery of a first side (1*a*) of the casing (1), by a grinding operation. Further, depth of the first groove (3) is defined to accommodate the glass (4) within the thickness (T) of the casing (1). It may be noted that, for producing the first groove (3), a myriad of processes employing various means such as, but not limited to, laser, ultrasonic, saw tools, disk tools and the like may be incorporated, and hence, one should not construe that the grinding operation employed herewith to be a limitation. Here, the thickness of the glass (4) may be in the range of about 0.3 millimeters to 0.8 millimeters. Further, the one or more provisions (5) are formed, by a drilling operation, in the casing (1), on the second side (1*b*). Here, each of the one or more provisions (5) is configured to receive the adapter (6*a*), which then receives the fastening member (7), for securing the back plate (8) of the ceramic timepiece (100) within the thickness of the casing (1). Furthermore, it may be noted that the one or more provisions (5) are defined with the anti-rotational profile such as, but, not limited to, triangle, square, rectangle, pentagon, and any other polygon. It may also be noted that, for producing the one or more provisions (5), a myriad of processes employing various means such as, but not limited to, laser, ultrasonic, drill tools, and the like may be incorporated therein.

Additionally, the pair of projections (9) is formed, by grinding operation, in opposing portions of the outer periphery of the casing (1) such that, the pair of projections (9) extends outwardly from the casing (1) and receive a strap (25) of the ceramic timepiece (100). It may be noted that, for producing the pair of projections (9), a myriad of processes employing various means such as, but not limited to, laser, ultrasonic, saw tools, disk tools and the like may be incorporated, and hence, one should not construe that the grinding operation employed herewith to be a limitation.

Similar to the forming of the first groove (3) and the one or more projections (9), the cut-out (12), the protrusion (13) and the second groove (18) are formed therein.

At a block 206, the casing (1) which is machined may be polished with a suitable material, in order to provide a lustrous appearance. Here, the polishing may be performed by means including, but not limited to, waxing, rubbing, buffing, chemical treatment, and the like.

It may be noted that the casing (1) and/or the dried ceramic substance may be quenched to a predetermined time, prior commencing with a next manufacturing process.

In one embodiment, the strap (25), particularly made of the ceramic material, may be manufactured in accordance with the pre-existing manufacturing processes. Further, the strap (25) may be a singular unit or may constitute a number of links interconnected therein.

In one embodiment, the ceramic timepiece (100) may be at least one of an analog ceramic timepiece, a hybrid ceramic timepiece, a smart ceramic timepiece and the like. Also, the movement (2) may be at least one of a mechanical movement, an automatic movement, an electromechanical movement, an electronic chip, and the like. Also, the strap (25) of the ceramic timepiece (100) may have a thickness ranging from about 3 millimeters to 3.5 millimeters.

In one embodiment, the strap (25) and the dial (50) may be manufactured independently and may be assembled post-production. Further, both the strap (25) and the dial (50) may be formed as a single unit.

In one embodiment, the securing means (2), for securement of the ceramic timepiece (100) may be at least one of a clip-lock mechanism, a press-fit mechanism, a slider-lock mechanism, a butterfly lock and the like.

It should be construed that the various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERICALS

| Particulars | Numeral |
|---|---|
| Casing | 1 |
| First side of the casing | 1a |
| Second side of the casing | 1b |
| Movement | 2 |
| First groove | 3 |
| Glass | 4 |
| One or more provisions | 5 |
| Adapter | 6a |
| Outer body of the adapter | 6b |
| Fastening member | 7 |
| Back plate | 8 |
| Pair of Projections | 9 |
| Internal threads | 10 |
| Step portion | 11 |
| Cut-out | 12 |
| Protrusion | 13 |
| Lateral hole | 14 |
| Operative stem | 15 |
| Dial plate | 16 |
| Support element | 17 |
| Second groove | 18 |
| Strap | 25 |
| Dial | 50 |
| Securing means | 75 |
| Ceramic timepiece | 100 |
| Width | W |
| Length | L |

We claim:

1. A case assembly for a ceramic timepiece, comprising:

a casing made of ceramic material and configured to accommodate a movement of the ceramic timepiece, the casing comprising:

a first groove defined in an inner periphery of a first side of the casing, the first groove is configured to accommodate a glass of the ceramic timepiece, within a thickness of the casing; and one or more provisions provided in a second side of the casing, each of the one or more provisions is configured to receive an adapter, wherein the adapter in each of the one or more provisions receives a fastening member, for securing a back plate of the ceramic timepiece within the thickness of the casing;

a pair of projections, extending outwardly from two opposing portions of an outer periphery of the casing, wherein the pair of projections receive a strap of the ceramic timepiece; and a step portion on the first side of the casing, wherein the step portion extends downwardly from an upper surface of the casing towards the pair of projections.

2. The case assembly as claimed in claim 1, wherein an outer body of the adapter is configured to match an anti-rotational profile of the one or more provisions.

3. The case assembly as claimed in claim 2, wherein the adapter includes a bore defined with a plurality of internal threads, to receive the fastening member.

4. The case assembly as claimed in claim 3, comprises a protrusion, extending in an inner surface of the casing, the protrusion is adapted to support a dial plate of the ceramic timepiece.

5. The case assembly as claimed in claim 1, comprises a cut-out, on the first side of the casing and between the pair of projections, to accommodate a protruding member of the strap.

6. The case assembly as claimed in claim 4, wherein the thickness of the casing ranges from about 4 millimeters to about 4.5 millimeters.

7. The case assembly as claimed in claim 1, wherein a thickness of the movement ranges from about 1.10 millimeters to 1.20 millimeters.

8. The case assembly as claimed in claim 1, wherein the pair of projections are configured such that, a width (W) of each projection of the pair of projections is at least two times of a length (L) of each projection of the pair of projections.

9. The case assembly as claimed in claim 1, wherein the glass is bonded to the first groove.

10. The case assembly as claimed in claim 1, wherein the casing comprises a lateral hole, extending from an outer surface to the inner surface of the casing, the lateral hole accommodates an operative stem in a transitional fit.

11. The case assembly as claimed in claim 1, wherein the casing comprises a second groove defined in an inner periphery in the second side of the casing, the second groove is configured to enclose the back plate.

12. The case assembly as claimed in claim 1, wherein said casing is bezel-free.

* * * * *